United States Patent [19]
Fader et al.

[11] 3,931,961

[45] Jan. 13, 1976

[54] SHOCK ABSORBER

[75] Inventors: John H. Fader; Johan H. Keijzer, both of Hasselt; Marcel J. R. Graulus; Roland H. C. Beets, both of St. Truiden, all of Belgium

[73] Assignee: Monroe Belgium N.V., Saint-Truiden, Belgium

[22] Filed: June 6, 1974

[21] Appl. No.: 477,475

Related U.S. Application Data

[63] Continuation of Ser. No. 307,783, Nov. 20, 1972, abandoned.

[52] U.S. Cl.............................. 267/64 R; 188/269
[51] Int. Cl.² ........................................... F16F 3/07
[58] Field of Search............... 267/64 R, 34, 23, 24; 188/269

[56] References Cited
UNITED STATES PATENTS

| | | | |
|---|---|---|---|
| 1,378,281 | 5/1921 | Ross | 267/34 |
| 2,048,418 | 7/1936 | Warren | 267/34 |
| 3,476,354 | 11/1969 | Stubblefield | 267/64 R |
| 3,528,650 | 9/1970 | Eastin | 267/64 R |
| 3,595,551 | 7/1971 | Ortheil | 267/64 R |

Primary Examiner—James B. Marbert
Attorney, Agent, or Firm—Harness, Dickey & Pierce

[57] ABSTRACT

A shock absorber comprising an elongated cylindrical pressure cylinder having a piston reciprocally disposed therewithin and connected to a piston rod extending outwardly from one end thereof, the piston rod carrying a dirt shield which extends coaxially of the pressure cylinder and in partial surrounding relationship therewith. The pressure cylinder is adapted to be filled with preselected quantities of hydraulic damping fluid and a pressurized gas for damping reciprocal movement of the piston therewith. The piston is provided with a novel valve arrangement which controls the compression and rebound characteristics of the shock absorber, and one end of the pressure cylinder is provided with a novel rod guide assembly which is designed so as to provide for convenient charging of the cylinder with the aforesaid pressurized gas. The interior of the pressure cylinder is provided with a generally helically shaped baffle arrangement which is compressible axially within the cylinder in response to reciprocal movement of ths piston therein and functions to prevent undersirable foaming or aeration of the hydraulic fluid during operation of the shock absorber.

4 Claims, 11 Drawing Figures

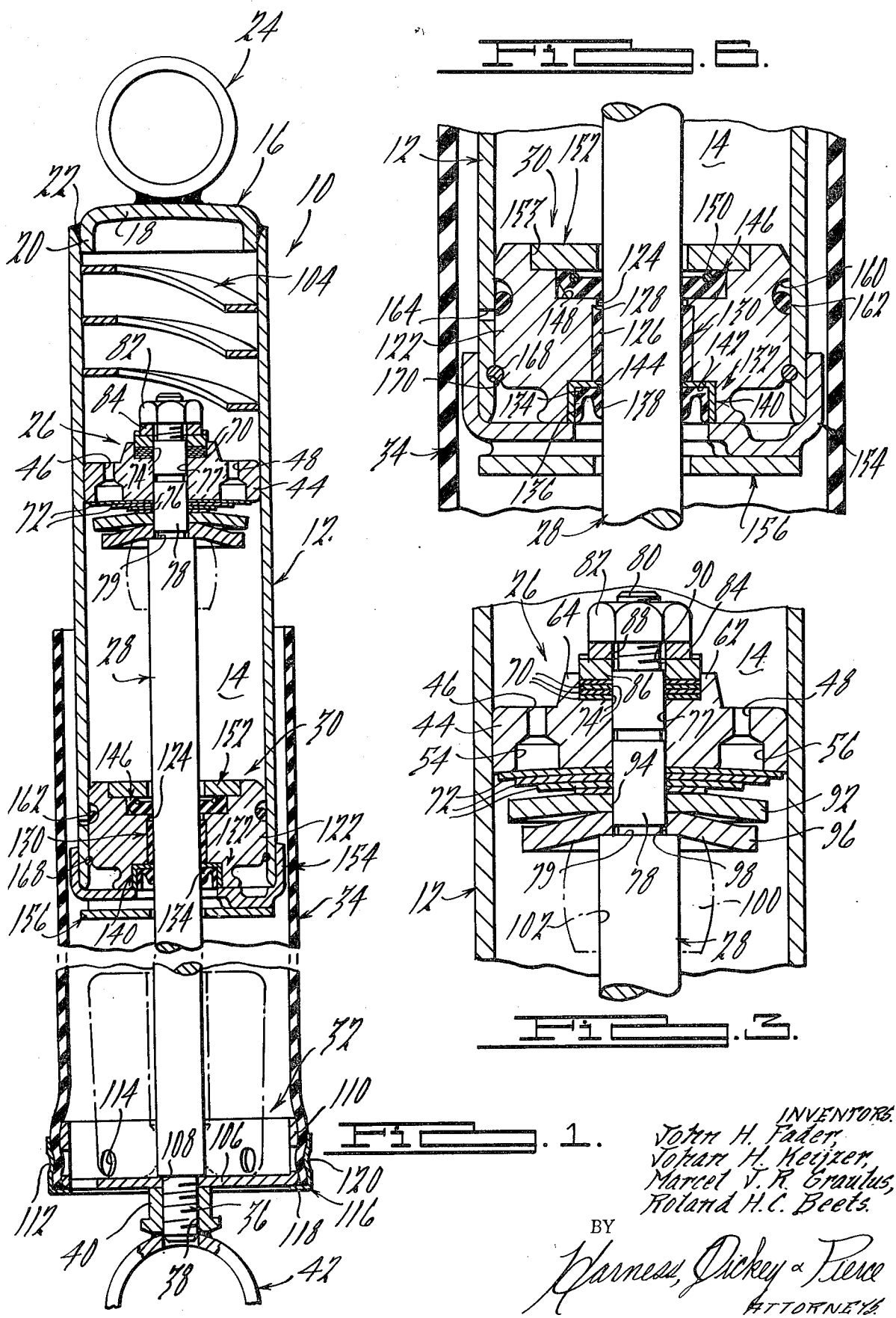

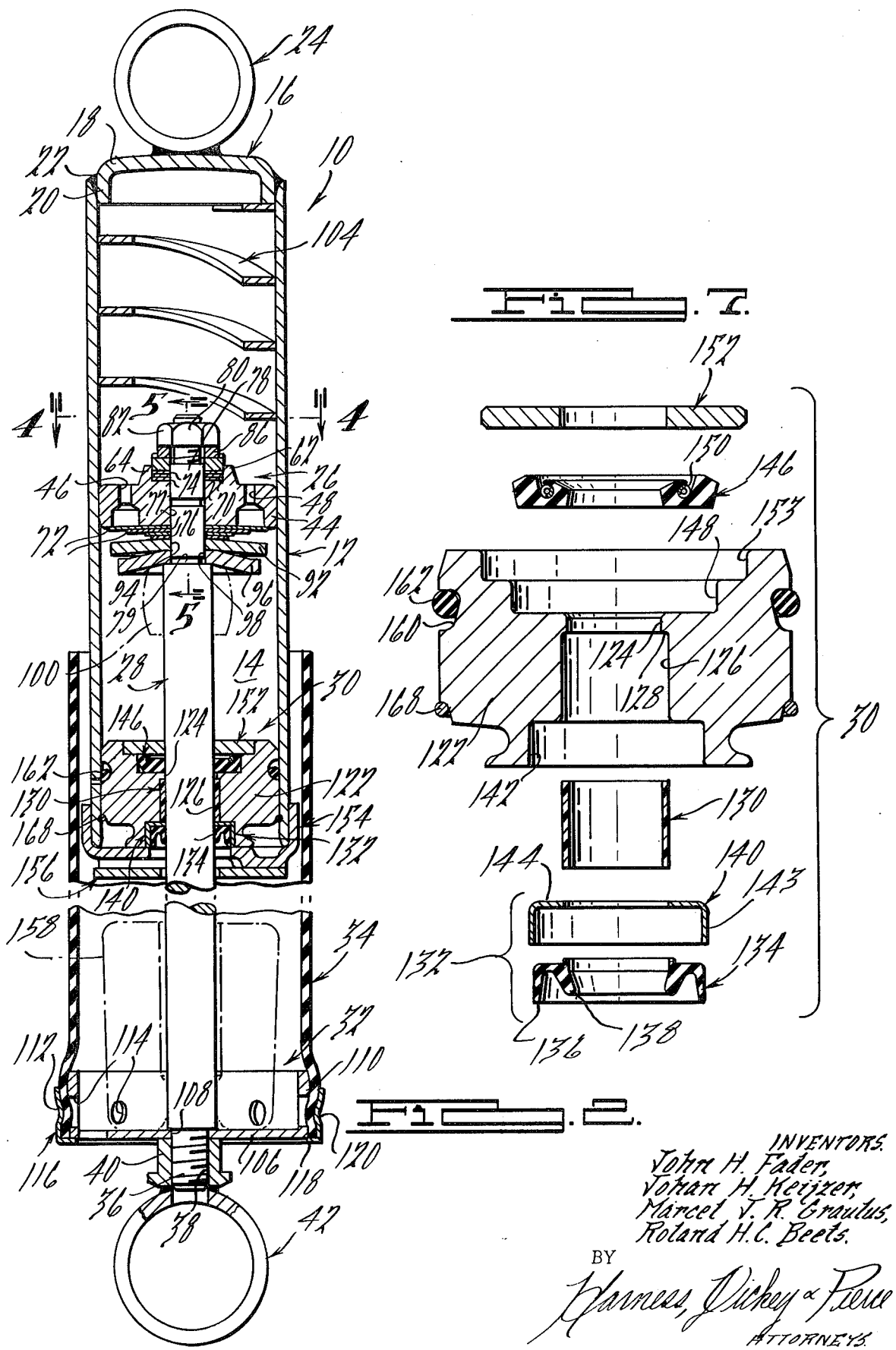

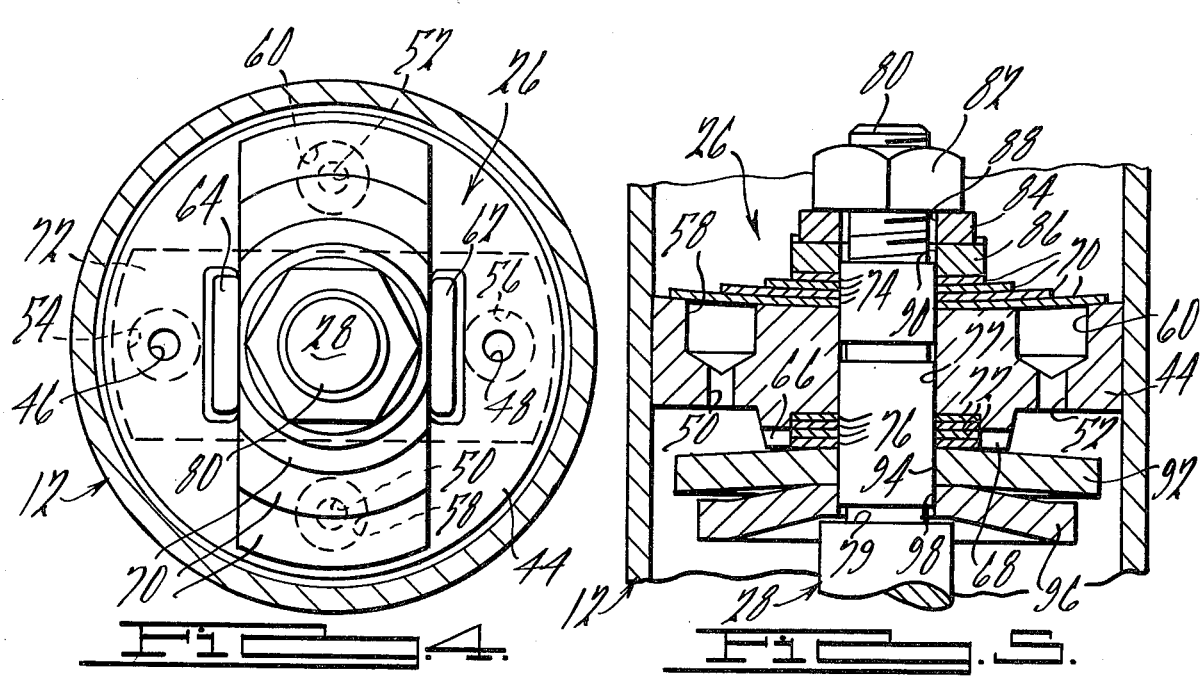

SHOCK ABSORBER

This is a continuation of application Ser. No. 307,783 filed Nov. 20, 1972.

SUMMARY OF THE INVENTION

The present invention relates generally to shock absorbers of the type used on automotive vehicles and the like for damping relative movement between the sprung and unsprung portions thereof. The shock absorber of the present invention is designed to have the interior thereof provided with a preselected quantity of hydraulic damping fluid and with a preselected quantity of a pressurized gas which cooperate with one another to damping reciprocal movement of a valved piston located within the pressure cylinder. The piston is provided with a new and improved valving arrangement which provides for interchangeability of the valve elements of the compression and rebound control valves thereof, which valves are located on the piston and are adapted to cooperate with a novel baffle arrangement which is disposed within one end of the pressure cylinder for preventing foaming or aeration of the hydraulic fluid which is undesirable since it prevents positive damping. The piston is connected to one end of a piston rod which extends axially outwardly from one end of the cylinder and is supported for longitudinal reciprocal movement by means of a rod guide assembly located at one end of the cylinder. The piston rod carries an elongated cylindrical dirt shield member which is arranged coaxially of the pressure cylinder and is adapted to be secured to the piston rod in a manner so as to minimize the overall size of the shock absorber and provide for economy of production and pleasant appearance of the shock absorber. The rod guide assembly is provided with a novel sealing arrangement which provides for fluid tight lowfriction peripheral engagement with the outer periphery of the piston rod and is adapted to be operatively mounted within one end of the pressure cylinder in a manner so as to minimize to the extreme, the time and effort required in charging the interior of the cylinder with the aforesaid pressurized gas.

It is accordingly a general object of the present invention to provide a new and improved shock absorber for use on automotive vehicles and the like.

It is a more particular object of the present invention to provide a new and improved vehicular shock absorber of the above described type which is provided with preselected quantities of hydraulic damping fluid and pressurized gas, and which is also provided with a novel baffle arrangement to prevent undesirable foaming or aeration of the fluid.

It is another object of the present invention to provide a new and improved shock absorber of the above character which features a valved piston having interchangeable compression and rebound valve elements.

It is a further object of the present invention to provide a shock absorber of the above character which is provided with a novel dirt shield mounting means.

It is still another of the present invention to provide a new and improved shock absorber of the above described type having a rod guide assembly featuring a novel fluid seal arrangement.

It is yet a further object of the present invention to provide a new and improved shock absorber of the above character wherein the rod guide assembly is designed to permit effortless charging of the interior of the pressure cylinder with pressurized gas or the like.

It is another object of the present invention to provide a new and improved shock absorber of the above described type which is of a relatively simple design, is economical to manufacture and will have a long and durable operational life.

Other objects and advantages of the present invention will become apparent from the following detailed description taken in conjunction with the accompanying drawings.

BRIEF DESCRIPTION OF THE DRAWINGS

FIG. 1 is a longitudinal cross-sectional view, partially broken away, of a shock absorber embodying the principles of the present invention;

FIG. 2 is a view similar to FIG. 1 and illustrates the shock absorber shown therein in a partially compressed condition;

FIG. 3 is an enlarged fragmentary cross-sectional view of the shock absorber piston embodying certain principles of the present invention;

FIG. 4 is a transverse cross-sectional view taken substantially along the line 4—4 of FIG. 2;

FIG. 5 is an enlarged fragmentary cross-sectional view taken substantially along the line 5—5 of FIG. 2;

FIG. 6 is an enlarged fragmentary cross-sectional view of the piston rod guide assembly incorporated in the shock absorbers of the present invention;

FIG. 7 is an exploded assembly view of the rod guide assembly shown in FIG. 6;

FIG. 8 is an exploded assembly view of the dirt shield mounting means incorporated in the shock absorber of the present invention; and FIGS. 9, 10 and 11 illustrate various positions of the rod guide assembly upon assembly thereof within the shock absorber of the present invention.

DETAILED DESCRIPTION OF THE PREFERRED EMBODIMENT

Referring now in detail to the drawings, a vehicular shock absorber 10, in accordance with an exemplary embodiment of the present invention, is shown as comprising an elongated cylindrical body member or pressure cylinder 12 which defines an internal chamber 14. The upper end of the chamber 14 is closed by a generally cup-shaped end cap 16 which has a generally radially disposed upper section 18 and an annular downwardly projecting flange section 20 that is adapted to be telescopically received within the upper end of the cylinder 12 and be fixedly secured therein, as by welding or the like designated at 22. The end cap 16 has fixedly secured thereto as by welding or the like, a generally ring-shaped attachment member 24 which is adapted to be secured in a conventional manner to the sprung portion of the associated automotive vehicle, as is well known in the art.

Disposed interiorly of the chamber 14 is a reciprocal piston assembly 26 which is attached to one end of an elongated piston rod 28 that is arranged coaxially of the cylinder 12 and is adapted to reciprocate therewithin along with the piston assembly 26. The lower end of the pressure cylinder 12 is provided with a rod guide assembly, generally designated 30, which is adapted to support the piston rod 28 for longitudinal reciprocal movement. The outer end of the rod 28 is provided with an end cap assembly, generally designated 32, which carries a generally cylindrically shaped enclosure member or dirt shield 34 that is arranged coaxially of the cylinder 12 and partially surrounds the lower end thereof, as best seen in FIG. 2. The lower end of the piston rod 28 is formed with a reduced diameter, externally threaded section 36 which is adapted to be threadably received within an internally threaded bore 38 of an annular collar member 40 which is secured as by welding or the like to an annular attachment member 42. The member 42 is adapted to be secured in a conventional manner to the unsprung portion of the associated automotive vehicle in a manner well known in the art and thereby functions along with the attachment member 24 in operatively supporting the shock absorber 10 of the present invention interjacent the sprung and unsprung portions of the vehicle, whereby the assembly 10 will function to effectively damp relative movement therebetween.

Referring now in detail to the construction of the piston assembly 26, as best seen in FIGS. 3 through 5, the assembly 26 comprises an annular body member 44 which is formed with a first pair of diametrically opposed, axially extending bores 46 and 48, and with a second pair of diametrically aligned, opposed bores 50 and 52 which are arranged at generally right angles to the bores 46, 48, as illustrated in FIG. 4. The bores 46, 48 are formed with a pair of enlarged diameter counterbores 54, 56, respectively, at the lower ends thereof, while the bores 50, 52 are formed with a pair of enlarged diameter counterbores 58, 60, respectively, at the upper ends thereof. The upper side of the body member 44 is formed with a pair of spaced parallel upwardly projecting embossed portions 62, 64, and the lower side of the body member 44 is formed with a pair of spaced parallel downwardly projecting embossed portions 66, 68 which are arranged at generally right angles to the embossed portions 62, 64. The portions 62, 64 and 66, 68 are adapted to operatively support therebetween a first plurality of valve plate elements 70 on the upper side of the body member 44 and a second plurality of identical elements 72 on the lower side of the body member 44. The pluralities of elements 70, 72 are generally flat and rectangular in shape and are disposed in overlying relationship with one another, with the plurality of elements 70 being nestingly received between the embossed portions 62, 64 and arranged in overlying relationship with respect to the bores 50, 52 and the plurality of elements 72 being nestingly received between the embossed portions 66, 68 and being arranged in underlying relationship with respect to the bores 46, 48. It will be seen that the elements 70, 72 disposed directly adjacent the upper and lower sides of the body member 44, respectively, extend almost diametrically the entire width of the body member 44, with the successive overlying or underlying elements 70, 72 associated therewith being progressively shorter in length to provide a leaf spring arrangement. The plurality of elements 70 are formed with a series of centrally aligned openings 74, while the plurality of elements 72 are formed with a similar series of centrally aligned openings 76. The openings 74, 76 are all aligned with a central bore 77 formed in the body member 44 and all of said openings 74, 76 and 77 are adapted to have a reduced diameter mounting sertion 78 of the piston rod 28 project upwardly therethrough, as best seen in FIG. 3. The section 78 of the piston rod 28 defines a generally radially disposed shoulder 79 and is formed with a reduced diameter externally threaded portion 80 at the upper end thereof, the portion 80 being adapted for threadable reception of a suitable retaining nut 82 or the like, as illustrated. Interposed between the upper side of the valve elements 70 and the nut 82 is a pair of retaining or bearing members 84 and 86 which define central bores 88 and 90, respectively, through which the upper end of the piston rod 28 extends. Similarly, interposed between the lower side of the valve elements 72 and radial shoulder 79 is a retaining plate 92 defining a central bore 94, and a bearing plate 96 defining a central bore 98. It will be seen that upon tightening of the nut 82 upon the threaded portion 80 of the piston rod 28, the pluralities of valve elements 70, 72 will be forced into compressive engagement with the upper and lower sides of the body member 44, whereby the central portions of the elements 70, 72 will be fixedly secured to the body member 44. The elements 70, 72 are preferably fabricated of a resilient spring-like material, such as spring steel or the like, whereby the outer marginal end portions thereof may be pivoted or biased upwardly or downwardly away from the adjacent upper and lower surfaces of the body member 44, whereby to provide for selective opening and closing of the bores 46, 48 and 50, 52, as will be described. The portion of the piston rod 28 directly below the bearing plate 96 may, if desired, be provided with a resilient compressible bumper member 100 which is provided with a central bore 102 adapted for sleeved reception upon the piston rod 28 as illustrated. The bumper member 100, upon outward movement of the piston rod 28 with respect to the pressure cylinder 12 will service as a cushioning means upon engagement thereof with the rod guide assembly 30, as will be apparent.

In operation of the shock absorber 10 of the present invention, the bores 46, 48 and plurality of valve elements 72 function in a rebound control valving capacity by selectively moving toward and away from the lower side of the body member 44 and thereby opening and closing a pair of flow paths from the interior of the chamber 14 to the bores 46, 48. Similarly, the bores 50, 52 and plurality of valve elements 70 function in a compression control valving capacity by moving toward and away from engagement with the upper side of the body member 44 so as to selectively open and close a pair of flow paths between the interior of the chamber 14 and the bores 50, 52, as will be apparent to those skilled in the art. A particular feature of the above described arrangement resides in the fact that the pluralities of valve elements 70, 72 are completely interchangeable with one another, whereby to minimize the attendant manufacturing and inventory expenses to the extreme. Additionally, the particular elongated, generally rectangular shape of the pluralities of elements 70, 72 provides for a substantial savings in material as compared with generally disc-shaped and similar styled valve elements known in the prior art.

As will hereinafter be described in detail, the interior of the chamber 14 is adapted to be filled with a preselected quantity of hydraulic fluid and is also adapted to be charged with a pressurized gas, such as compressed air, nitrogen or the like. One problem that has been particularly objectionable in connection with similar type shock absorbers heretofore known and used which utilize as a damping medium a combination of hydraulic fluid and pressurized gas, has been the aeration or foaming of the hydraulic fluid which occurs upon reciprocal movement of the associated piston within the pressure cylinder. Such foaming or aeration of the hydraulic fluid is particularly objectionable due to the fact that the hydraulic fluid tends to become compressible and thus adversely affects the damping efficiency of the shock absorber. The aeration problem has been found to be aggravated by the high velocity flow of fluid through the valving of the associated piston and thus shock absorber assemblies provided with valve pistons has been notorious for their aeration problems.

In accordance with the present invention, the aforementioned aeration of the hydraulic damping fluid within the chamber 14 is effectively obviated through the provision of a novel baffle member, generally designated by the numeral 104, which is disposed within the chamber 14 interjacent the upper side of the piston assembly 26 in the end cap 16. As best seen in FIGS. 1 and 2, the baffle member 104 is of a generally helical configuration and has a maximum outer diameter which is designed to be received within the pressure cylinder 12 with slight interference fit, whereby baffle member 104 is axially movable within the chamber 14 in response to axial movement of the piston assembly 26. The baffle member 104 is preferably fabricated of a resilient material such as spring steel or the like and the radial dimension of each convolution thereof is designed to project radially inwardly from the wall of the pressure cylinder 12 to a position overlying or in axial alignment with upper ends of the bores 46, 48 and 50, 52, whereby fluid which flows through the bores 50, 52 will impinge against the lower side of the baffle member 104. By virtue of the helical configuration of the baffle member 104 and the spring-like character of the material from which it is fabricated, the member 104 is adapted to be compressed axially as the piston assembly 26 moves upwardly within the chamber 14. Thus, the baffle member 104 may be compressed, for example, from the position shown in FIG. 2 to the position shown in FIG. 1. In accordance with the present invention, at least a portion of the baffle member 104 is disposed below the fluid level within the chamber 14, i.e., is submerged within the hydraulic damping fluid, which arrangement has been found to optimize the action of the baffle member 104 in preventing aeration or foaming of such fluid. It will be noted, however, that even where the baffle member 104 has no portion thereof submerged within the fluid, said member 104 will be found to operate highly efficiently in preventing fluid aeration. In operation of the shock absorber 10, it will be noted that as the piston assembly 26 moves upwardly within the chamber 14, the fluid level therein will also move upwardly, as will the lower end of the baffle member 104, with the result that at least a portion of the member 104 will remain submerged within the fluid in order to prevent the undesirable aeration or foaming of the fluid.

Referring now in detail to the construction of the end cap assembly 32, as best seen in FIGS. 1, 2 and 8, the assembly 32 comprises a generally radially disposed end section 106 which defines a central annular bore 108 through which the section 36 of the piston rod 28 extends. The marginal outer edge of the section 106 is formed with an annular axially upwardly extending flange section 110 which is formed with an enlarged thickness or bead portion 112 and with a plurality of circumferentially spaced radially outwardly extending openings 114. The diameter of the flange section 110 is slightly smaller than the diameter of the dirt shield member 34 and is thereby adapted to be telescopically or sleeved within the lower end thereof, as best seen in FIGS. 1 and 2. The dirt shield member 34 is fabricated of a resilient deformable material, such as molded rubber or the like, and is thereby adapted to deform or expand radially outwardly in order to accept the flange section 110 within the lower end thereof. The end cap assembly 32 also comprises an annular retaining ring member 116 which is slightly larger in diameter than the flange section 110 and is adapted to be sleeved over the outer periphery of the lower end of the dirt shield member 34 in the manner shown in FIGS. 1 and 2. The retaining ring member 116 is formed with a generally radially inwardly disposed shoulder portion 118 around the lower side thereof which is adapted to abut against the underside of the end section 106, as illustrated. In accordance with the present invention, in order to positively secure the retaining ring member 116, end section 106 and dirt shield member 34 in a single unitized assembly which is secured to the piston rod 28 in the manner hereinabove described, the flange section 110 and member 116 are adapted to cooperate in deformingly securing the lower end of the member 34 therebetween. More particularly, upon assembly of the retaining ring member 116 over the lower end of the dirt shield member 34, a plurality of radially inwardly projecting, circumferentially spaced, embossed portions, generally designated 120, are formed around the retaining ring member 116, which embossed portions 120 are radially aligned with the openings 114 in the flange section 110 in a manner so as to deform the resilient material from which the dirt shield member 34 is fabricated radially inwardly into the openings 114. The formation of the embossed portions 120 may be accomplished by any suitable crimping or collect type die or tool arrangement and will be seen to positively fixedly secure the dirt shield member 34 against relative axial movement with respect to the end cap assembly 32. A particular feature of the above arrangement resides in the fact that the overall diameter or size of the lower end of the shock absorber 10 is kept to a minimum. Additionally, the above described design is pleasant in appearance and obviates the objectionable outwardly projecting "ears" which exist when conventional hose clamps or the like are utilized in securing dirt shields in similar type shock absorber designs. Moreover, the securing arrangement will be found to be substantially more economical than prior known dirt shield fastening methods.

Referring now in detail to the construction and operation of the rod guide assembly 30, as best seen in FIGS. 6 and 7, the assembly 30 comprises an annular body member 122 which is formed with a central annular bore 124 through which the piston rod 28 extends. The lower end of the bore 124 is formed with an enlarged diameter counterbore 126 which defines a generally radially disposed shoulder 128. Disposed within the counterbore 126 is an annular or sleeve-shaped lining member 130 which has the inner periphery thereof slidingly peripherally engaged with the outer periphery of the piston rod 28, as illustrated. The lining member 130 is fabricated of a suitable low-friction material, such as teflon which is provided with a suitable rigidifying material such as carbon or the like, whereby to provide for low frictional resistance of reciprocal movement of the piston rod 28 relative to the assembly 30. The lining member 130 is adapted to be secured within the body member 122 by being axially retained between the shoulder 128 and a wiper assembly, generally designated 132, that is mounted at the lower end of the body member 122. The wiper assembly 132 comprises an annular wiper member 134 which is arranged circumjacent the periphery of the piston rod 28 and is fabricated of a suitable resilient deformable material such as rubber or the like. The member 134 comprises outer and inner peripheral lip portions 136 and 138, respectively, the latter of which is adapted for compressive engagement with the outer periphery of the piston rod 28 in a manner so as to "wipe" any road dirt, moisture or any other foreign material off from the outer periphery of the piston rod 28 as the same moves upwardly into the pressure cylinder 12. Thus, the wiper member 134 prevents any dirt or other foreign material from ingressing between the outer periphery of the piston rod 28 and the inner periphery of the lining member 130 to prevent possible scoring or other damage to the mutually confronting surfaces of either of these compounds. The wiper member 134 is adapted to be retained within the lower side of the body member 122 by means of an annular wiper housing 140 which is disposed within an enlarged diameter annular counterbore 142 formed in the lower side of the body member 122. The housing 140 comprises a generally axially extending section 143 which extends around the outer periphery of the lip portion 136 and a generally radially disposed flange section 144 which projects radially inwardly above the wiper member 134 and abuttingly engages the lower end of the lining member 130, as illustrated.

Disposed within the upper end of the body member 122 is an annular fluid seal 146 which is nestingly received within a suitable counterbore 148 formed around the upper end of the bore 124. The seal is preferably provided with a retaining or garter spring 150 which assures positive sealing engagement thereof with the outer periphery of the piston rod 28 to prevent any hydraulic fluid from passing downwardly through the bore 124 upon reciprocation thereof. An annular retaining ring 152 is disposed within a suitable complementary-shaped annular recess 153 provided in the top of the body member 122 for operatively securing the seal 146 in place.

The entire rod guide assembly 30 is adapted to be received within the lower end of the pressure cylinder 12 and be secured therein by a suitable retaining cap or the like, generally designated 154, which may be secured over the lower end of the cylinder 12 and be secured thereto by any suitable means. The cap 154 may be provided with a bearing plate 156 on the lower side thereof adapted for abutting engagement with a resilient deformable compression bumper 158 which may be provided in the lower end of the dirt shield 34, as illustrated. It may be noted that by virtue of the fact that the dirt shield member 34 is fabricated of a resilient deformable material, any radially outward expansion of the bumper 158 upon engagement thereof with the plate 156 will result in outward deformation of the dirt shield member 34 so that there will be no resistance to the cushioning effect of the bumper 158. Additionally, by virtue of the fact that both of the components 138 and 154 are fabricated of a resilient deformable material, there will be no metal-to-metal contact so as to minimize the attendant noise during operation of the shock absorber 10. As best seen in FIGS. 6 and 7, the outer periphery of the body member 122 is formed with an annular, radially inwardly formed recess 160 which is adapted to nestingly receive a suitable O-ring 162 or similar type sealing member that provides a fluid-tight seal with the inner periphery of the pressure cylinder 12 upon assembly of the body member 122 within the lower end thereof.

In accordance with one of the features of the present invention, in order to charge or induce pressurized gas into the interior of the chamber 14, a suitable opening or gas port 164 is formed in the wall of the cylinder 12 adjacent the lower end thereof, as best seen in FIGS. 9 through 11. In order to perform the gas charging operation, the unitized assembly consisting of the body member 12, O-ring 162, wiper assembly 132, liner 130, fluid seal 146 and retaining ring 152, is inserted axially within the lower end of the pressure cylinder 12 from the position shown in FIG. 9 to the position shown in FIG. 10. It may be noted that when the aforesaid assemblage is located as shown in FIG. 10, the O-ring sealing member 162 sealingly engages the inner periphery of the pressure cylinder 12, yet the upper end of said assemblage does not interfere with gas being introduced through the port 164 so that the charging operation can be performed without any of the gas leaking into the atmosphere through the lower end of the cylinder 12. After the charging or filling operation has been completed and a predetermined quantity of pressurized gas has been introduced into the chamber 14, the aforementioned assemblage may be biased axially upwardly when the lower end of the pressure cylinder 12 from the position shown in FIG. 10 to the position shown in FIG. 11, which results in the O-ring sealing member 162 being moved axially past the port 164 to a position located axially thereabove, whereby to prevent any gas leakage from the chamber 14 through the port 164. The entire assemblage may then be operatively secured within the lower end of the pressure cylinder 12 by means of a suitable retaining and/or sealing ring 168 which is adapted for nesting reception within a suitable recess 170 defined between the inner periphery of the cylinder 12 and the outer periphery of the body member 122, after which time the retaining cap 154, etc. may be operatively mounted.

While it will be apparent that the preferred embodiment illustrated herein is well calculated to fulfill the objects above stated, it will be appreciated that the present invention is susceptible to modification, variation and change without departing from the scope of the invention.

We claim:
1. A pressurized shock absorber assembly comprising an elongated pressure cylinder adapted to contain preselected quantities of hydraulic fluid and a compressible gas,
   a piston reciprocably mounted within said pressure cylinder and including valve means,
   a volume of hydraulic damping fluid within said cylinder cooperable with said valve means for damping reciprocable movement of said piston,
   a quantity of gas within one end of said cylinder and defining a gas-fluid interface with said fluid,
   a piston rod connected to and reciprocable with said piston, and
   a helical baffle member within the same end of said cylinder as said quantity of gas,
   said baffle member extending through said gas-fluid interface so that a portion of said member is disposed within said quantity of fluid and the remaining portion of said member is disposed within said quantity of gas, said baffle member extending radially of said cylinder so as to have the outer periph- ery of the convolutions thereof engageable in a slight interference fit with the inner periphery of said cylinder, with said member comprising the sole element between said piston and said end of said cylinder within which said quantity of gas is located, whereby said member will act to minimize aeration of said fluid upon reciprocal movement of said piston and piston rod.

2. A pressurized shock absorber assembly comprising an elongated pressure cylinder adapted to contain preselected quantities of hydraulic fluid and a compressible gas,
   a piston reciprocably mounted within said pressure cylinder and including valve means for damping reciprocable movement of said piston,
   said valve means including at least one axially extending flow port formed in said piston for communicating fluid from one side of said piston to the opposite side thereof upon reciprocation of said piston within said cylinder,
   a volume of hydraulic damping fluid within said cylinder cooperable with said valve means,
   a quantity of gas within one end of said cylinder and defining a gas-fluid interface with said fluid,
   a piston rod connected to and reciprocable with said piston, and
   a helical baffle member within the same end of said cylinder as said quantity of gas,
   said baffle member having a first part submerged within said fluid and a second part disposed within said gas, said baffle member extending radially of said cylinder so as to have the outer periphery of the convolutions thereof engageable with the inner periphery of said cylinder, with said member comprising the sole element between said piston and said end of said cylinder within which said quantity of gas is located, said member also having a portion of the end thereof adjacent said piston disposed in substantial axial alignment with said flow port in said piston so as to at least partially influence the flow of fluid passing through said flow port into the end of said cylinder within which said baffle member is disposed.

3. A pressurized shock absorber assembly comprising an elongated pressure cylinder adapted to contain preselected quantities of hydraulic fluid and a compressible gas,
   a piston reciprocably mounted within said pressure cylinder and including valve means for damping reciprocable movement of said piston,
   a volume of hydraulic damping fluid within said cylinder cooperable with said valve means,
   a quantity of gas within one end of said cylinder and defining a gas-fluid interface with said fluid,
   a closure member closing one end of said cylinder,
   a piston rod extending through said closure member and being coaxially disposed within one end of said cylinder,
   said piston rod being connected to and reciprocable with said piston, and
   a helical baffle member located in the opposite end of said cylinder from said piston rod and being partially submerged within said quantity of fluid for preventing aeration of said fluid upon reciprocal movement of said piston and piston rod,
   said baffle member extending radially of said cylinder so as to have the outer periphery of the convolutions thereof engageable with the inner periphery of said cylinder, with said member comprising the sole element between said piston and said end of said cylinder within which said quantity of gas is located.

4. A pressurized shock absorber assembly comprising a generally vertically disposed pressure cylinder,
   a piston reciprocably mounted within said pressure cylinder and including valve means,
   said valve means including at least one axially extending flow port formed in said piston for communicating fluid from one side of said piston to the opposite side thereof upon reciprocation of said piston within said cylinder,
   a volume of hydraulic damping fluid within the lower end of said cylinder cooperable with said valve means for damping reciprocable movement of said piston,
   a quantity of gas within the upper end of said cylinder and defining a gas-fluid interface at the uppermost part of said fluid and the lowermost part of said gas,
   a closure member closing the lower end of said cylinder,
   a piston rod extending upwardly through said closure member connected to the lower side of said piston, and
   a helical baffle member disposed within the upper end of said cylinder and located on the opposite side of said piston from said piston rod,
   said baffle member extending axially through said gas-fluid interface and generally radially within said cylinder and having a portion of the lower end thereof disposed in substantial axial alignment with said flow port in said piston so as to at least partially block the flow of fluid passing upwardly through said flow port into the upper end of said cylinder upon downward movement of said piston therein, said baffle member extending radially of said cylinder so as to have the outer periphery of the convolutions thereof engageable with the inner periphery of said cylinder, with said member comprising the sole element between said piston and said end of said cylinder within which said quantity of gas is located, whereby to reduce the aeration of said fluid.

* * * * *